United States Patent [19]
Zeh et al.

[11] 3,937,012
[45] Feb. 10, 1976

[54] ARRANGEMENT FOR THE PRODUCTION OF ROTATIONAL ENERGY IN ROCKET COMBUSTION ENGINES

[75] Inventors: Willi Zeh, Neuenstadt, Kocher; Werner Beck, Weinsberg; German Munding, Bad Friedrichshall, all of Germany

[73] Assignee: Messerschmitt-Bolkow-Blohm GmbH, Germany

[22] Filed: Dec. 10, 1973

[21] Appl. No.: 423,127

Related U.S. Application Data

[63] Continuation of Ser. No. 203,115, Nov. 26, 1971, abandoned.

[30] Foreign Application Priority Data
Nov. 28, 1970 Germany............ 2058583

[52] U.S. Cl............ 60/39.74 A; 60/39.74 S
[51] Int. Cl.² ........................ F02G 1/00
[58] Field of Search ........ 60/204, 39.74 S, 39.74 A, 60/258

[56] References Cited
UNITED STATES PATENTS

| | | | |
|---|---|---|---|
| 2,395,403 | 2/1946 | Goddard | 60/201 |
| 2,602,290 | 7/1952 | Goddard | 60/258 |
| 3,036,428 | 5/1962 | Chillson | 60/39.74 S |
| 3,169,368 | 2/1965 | Munding | 60/258 |
| 3,568,445 | 3/1971 | Munding et al. | 60/258 |
| 3,717,999 | 2/1973 | Wilson | 60/258 |

Primary Examiner—Samuel Feinberg
Attorney, Agent, or Firm—McGlew and Tuttle

[57] ABSTRACT

An arrangement for producing rotational energy, particularly for generating thrust gases in rocket combustion chambers using hypergolically reacting propellants, comprises a rocket combustion chamber having a closed end and a gas discharge end with an impeller mounted in the closed end. The impeller has a plurality of spaced vanes which extend radially and which define flow ducts therebetween having discharge ends which extend substantially tangential to the combustion periphery. The apparatus includes means for directing hypergolically reacting propellant components into the combustion chamber at a location in which they are deposited at the inner radial ends of the flow ducts. The oxygen carrier propellant is supplied radially inside of the other propellant component so that it forms a cooling veil along the impeller. The impeller is advantageously rotatably mounted so that the components are whirled outwardly into the combustion chamber and the individual blades are provided with passages in order to enhance the interreaction of the propellant components.

6 Claims, 5 Drawing Figures

ARRANGEMENT FOR THE PRODUCTION OF ROTATIONAL ENERGY IN ROCKET COMBUSTION ENGINES

This is a stream continuation, of application Ser. No. 203,115 filed Nov. 26, 1971 and now abandoned.

BACKGROUND OF THE INVENTION

1. Field of the Invention

This invention relates in general to an apparatus and method for introducing hypergolically reactive components into a combustion chamber and, in particular, to a new and useful arrangement for the production of rotational energy which comprises means for introducing two hypergolically reactive propellant components onto an impeller having passages which discharge substantially tangentially into a combustion zone.

2. Description of the Prior Art

With the known rotational burners for combustion chambers which are activated with atmospheric oxygen, the primary combustion oxygen flows over the impeller vanes into the combustion chamber and thereby atomizes the injected propellant. A combustion between the propellant and the oxygen of the atmosphere does not take place in the interstitial spaces of the whirling flow of gases. With the known rocket propulsion chamber constructions which employ combustion fuel and oxygen it is common to use a cooling medium for cooling the inside of the combustion chamber wall, for example a medium such as water which does not actively participate in a combustion chamber process. Such a medium is fed in a whirling stream into the combustion chamber through a ring slot having an axially directed opening in order to insure that the medium has a secure adhesion to the interior of the combustion chamber. U.S. Pat. No. 2,654,997 indicates a construction with a whirling flow of cooling medium alongside the interior of the combustion chamber and both propellant components are fed at the periphery of the chamber tangentially therealong. With this construction, the rotational flow is maintained in a central region of the combustion chamber in order to cause a return gas current flow as a consequence of the depression which occurs there, so that the path of the final combustion and also the constructive length of the combustion chamber is contracted and the very hot core of the combustion flame in the center of the combustion chamber is stabilized mechanically in terms of current flow. With such a construction, the final combustion of the combustion mixture toward the inside of the combustion chamber is guaranteed and the combustion chamber wall remains protected from thermal damage. Even though with the known construction there is a whirling tangential flow of the propellant component, such a whirling flow is insufficient in many cases and it is not intensive enough. As indicated in U.S. Pat. No. 3,169,368, additional torque chambers are arranged before the main combustion chamber in order to form compact rotational currents in these chambers which continues over the overflow opening into the main combustion chamber. Even with such a construction, however, the kinetic energy contained in the propellant components is only sufficient for the required turbulance in the main combustion chamber because an ignition of the mixture is only provided for, or is only desirable, in the main combustion chamber. The kinetic energy which is effective in the direction of the circumference amounts to only a fraction of the energy which is freed in all possible directions by the reaction of the propellant components in the main combustion chamber. These gases which expand in all directions, however, do not permit the necessary generation of rotational current in the main combustion chamber for the formation of a central return flow.

In accordance with the present invention, the disadvantages of the prior art constructions are overcome and a construction is provided to guarantee an intensive whirling propellant and gas flow. This is provided in accordance with the invention by an arrangement of impeller vanes in a radial or substantially radial plane with flow ducts defined between the vanes which are directed tangentially to the combustion chamber periphery. The propellant components are directed into the flow passages where they interact or at least partially pre-react. The propeller vanes are arranged on a propellant obturator head which projects centrally into the combustion chamber from the closed or front end thereof. The propellants are fed radially into the inner ends of the flow ducts defined between the impeller blades.

In order to achieve at least a local condensation of the propellants for their fast reaction, the impeller vanes are curved in such a way that a depression area is formed by means of flow currents or eddies on their rear sides. In the depression area there are provided openings through the blades which provide flow passages between adjacent ducts through which partial amounts of centrifugally accelerated propellants are passed from one impeller duct into a condensation zone of the other impeller duct.

According to a further feature of the invention, the propellant components are fed coaxially to each other into the impeller ducts and the oxygen or oxygen carrier is supplied radially inwardly of the fuel propellant.

A further embodiment of the invention comprises the arrangement of the impeller vanes in the combustion chamber wall. In the formation of this embodiment, it is advantageous to provide propellant ring conduits having discharge openings extending into the impeller ducts and which advantageously include more than one aligned drillings which are oriented so that their discharges intersect.

In a further embodiment of the invention, the combustion chamber wall is provided with coolant ducts along which is conveyed a propellant component especially oxygen in order to permit the coolant ducts to discharge into the impeller ducts through discharge openings defined around the ring conduits.

In accordance with the method of the invention, a plurality of propellant components are directed into the closed end of a rocket engine combustion chamber onto the surface of a rotating impeller which includes radially extending flow passages, and wherein the impeller is rotated to hurl the components along the passages and to discharge them substantially tangentially into the combustion chamber, and wherein flow from one adjacent passage to another is provided to pass the propellant from one impeller duct into a condensation zone of another impeller duct.

With the invention, the general advantage of achieving an intensive whirling flow with high energy content takes place as a consequence of the reaction of the propellant components or at least a pre-reaction which takes place in the individual impeller passageways or ducts of the impeller. The resultant high energy of these components are directed in a substantially peripheral direction. The individual impeller passages or ducts are similar to a prechamber of a diesel motor, for example, which has a gas emission substantially directed to the periphery. An intensified whirling flow does not only affect the combustion and maintaining of a strong central return current flow, but also contributes to the formation of a rotational symmetric whirling flame combustion with radially outwardly diminishing temperatures. Through sufficient rotation, the cooler and consequently heavier liquid and gas particles not yet participating in the reaction process are centrifugally moved toward the combustion chamber wall and they are kept there to cool the wall until they are drawn back into the central return flow area toward the end of the combustion chamber. Local overheating of the combustion chamber wall is therefore practically avoided. By feeding the propellant components coaxially to each other and by adding the oxygen component radially inwardly onto the impeller, an intensive cooling takes place and an interreaction of the propellant components. The oxygen component is first spread over the area of the rotating impeller and provides a protective cooling film before the application of the other propellant component. The cooling action of the oxygen also causes a heating of the oxygen so that it contributes to the condensation of the propellant components. The rotating impeller maintains the combustion and contributes to the formation of an intensive return current flow of gases.

Accordingly, it is an object of the invention to provide an arrangement for the production of rotational energy, in particular, for rocket combustion chambers which are activated with hypergolically reacting propellant components which comprises an impeller rotatively mounted in the closed end of a combustion chamber and with means for directing propellant components onto the impeller to cause them to move between flow ducts defined between impeller blade portions and be discharged peripherally into the combustion chamber for hypergolic reaction therewithin.

A further object of the invention is to provide a combustion chamber construction which includes a rotatable impeller with a plurality of impeller blades arranged over a flat disk portion and which define radially extending flow ducts therebetween, and including means for directing at least two propellant components to the inner radial end of the impeller for flow through the radial flow passages, and wherein the impeller may be arranged centrally within the combustion chamber or within an exterior wall of the combustion chamber.

A further object of the invention is to provide a method of operating a combustion chamber having a rotating impeller with blades extending substantially radially defining flow passages therebetween comprising directing at least two propellant components to the inner radial end of the flow passages of the impeller while the impeller is rotated to cause the propellant components to move along the passages and to interact and wherein the oxygen propellant component is advantageously added so as to cool the surface of the impeller.

A further object of the invention is to provide an arrangement for the production of rotational energy which is simple in design, rugged in construction and economical to manufacture.

The various features of novelty which characterize the invention are pointed out with particularity in the claims annexed to and forming part of this disclosure. For a better understanding of the invention, its operating advantages and specific objects attained by its uses, reference should be had to the accompanying drawing and descriptive matter in which there is illustrated preferred embodiments of the invention.

GENERAL DESCRIPTION OF THE PREFERRED EMBODIMENTS

Figure 1:
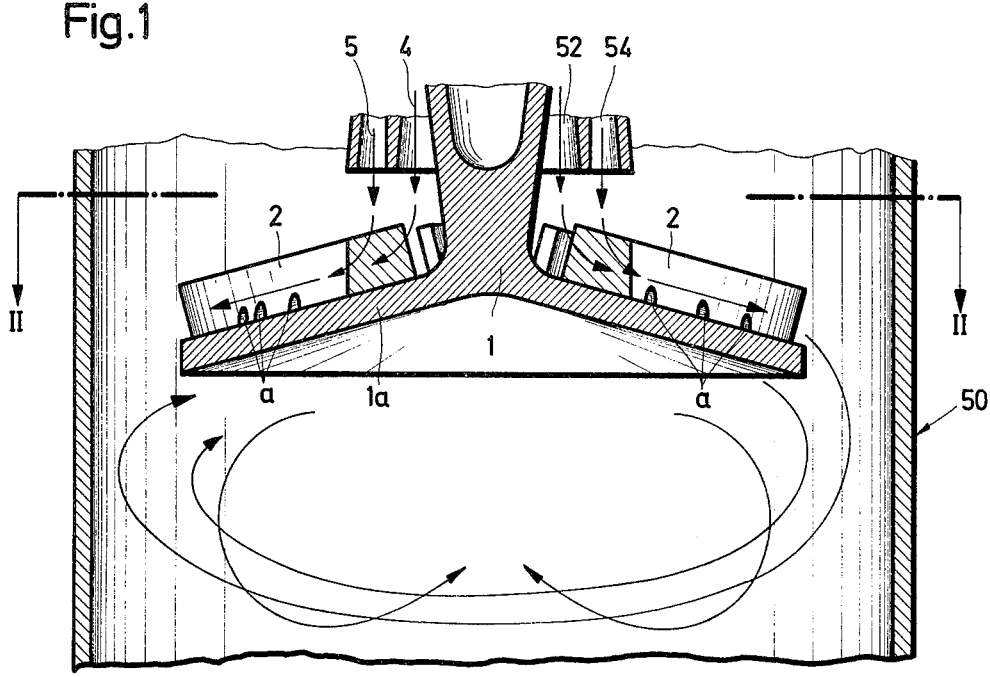
FIG. 1 is a longitudinal sectional view of the closed end of a rocket engine combustion chamber constructed in accordance with the invention.
Figure 2:
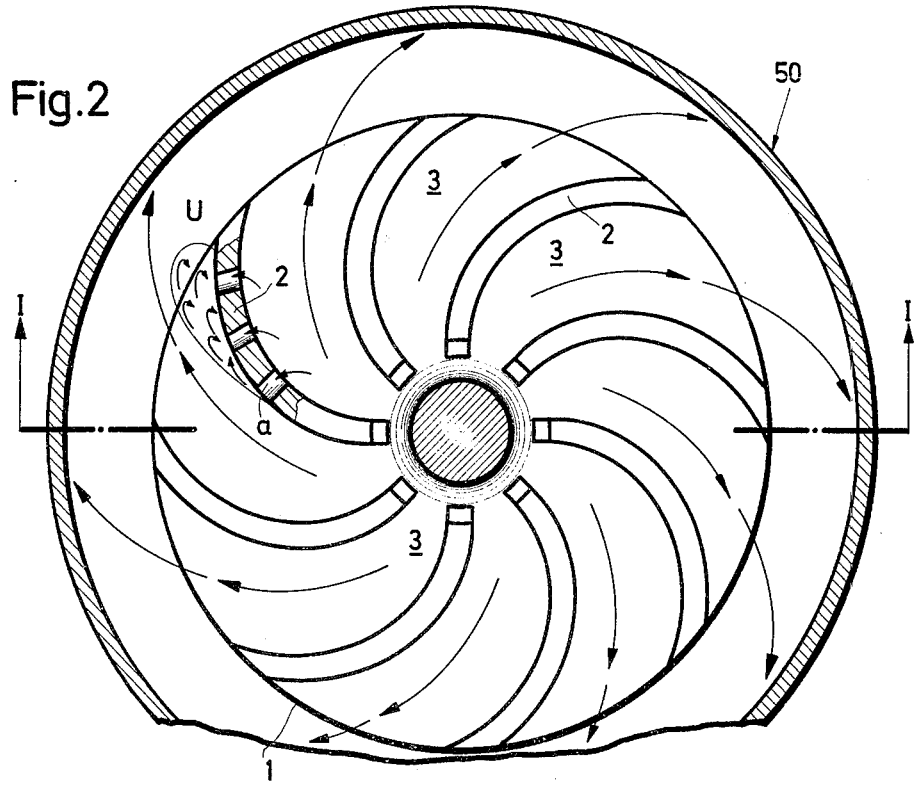
FIG. 2 is a section taken along the line II—II of FIG. 1.

Referring to the drawings in particular, the invention embodied therein in FIGS. 1 and 2 comprises a rocket engine combustion chamber, generally designated 50, which has a front or closed end in which is mounted a propellant obturator head or impeller 1 which is advantageously rotatably mounted in the closed end wall. The impeller 1 includes a plurality of vanes 2 which extend generally radially and which define flow ducts 3 therebetween over an inclined deck or base portion 1a of the impeller.

In accordance with the invention, hypergolical propellant components are directed inwardly through a plurality of annular supply ducts 52 and 54 into the combustion chamber in a manner such that an oxygen component is delivered as indicated by the arrow 4 radially inwardly in respect to another propellant component indicated by the arrow 5. The oxygen component is directed downwardly onto the inner end of the disk portion 1a and it flows radially outwardly therealong and provides a cooling veil over the top surface thereof. The propellant component 5 is supplied over the cooling oxygen layer.

The propellant components 4 and 5 react as they move along the passages 3 at least partially. The impeller vanes 2 are curved so that on their rear sides a U-shaped depression area with cavitation effects is formed in the area designated by the letter U. The propellants can condense at least in this area and their reaction is assured. This construction is of particular advantage for the coupling of the propellant components whose hypergolic qualities remain relatively sluggish. In order to intensify the reaction which has already started in the U-shaped depression area U and to resupply it with fresh propellant components, perforations A are provided through the vanes 2 to permit flow from the adjacent passage into the condensation zone.

Figure 3:
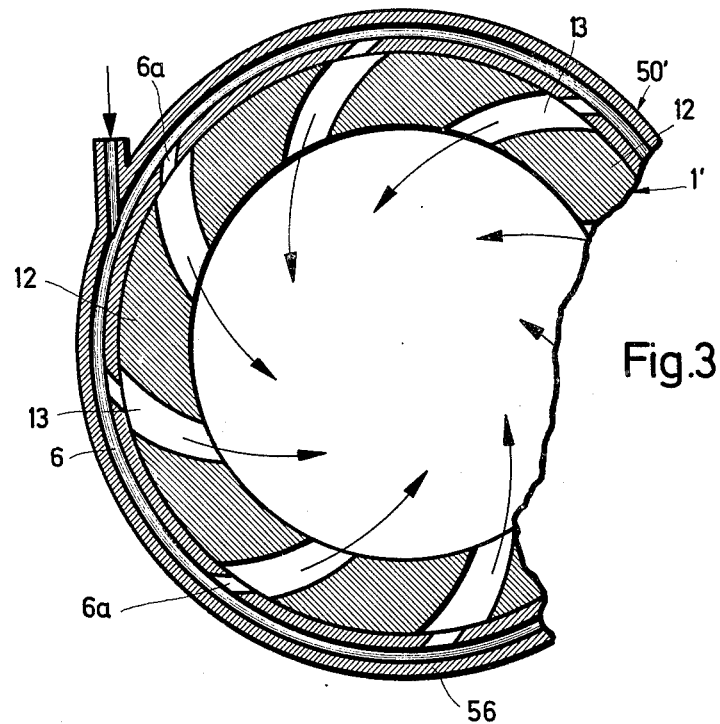
FIG. 3 is a view similar to FIG. 2 of another embodiment of the invention.
Figure 4:
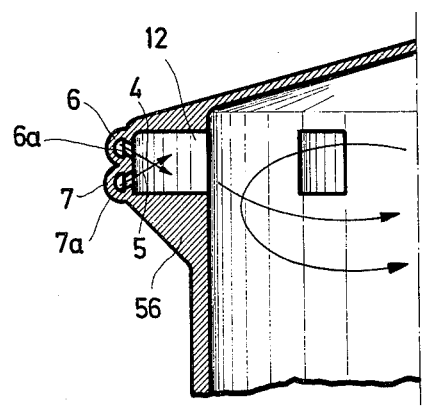
FIG. 4 is a partial longitudinal sectional view of the embodiment shown in FIG. 3.

In the construction shown in FIGS. 3 and 4, a rocket combustion chamber generally designated 50' includes an impeller 1' having impeller vanes 12 which are located inside the combustion chamber wall 56. Propellant components are supplied through propellant ring conduits 6 and 7 and an oxygen propellant component indicated by the arrow 4 is directed outwardly through a nozzle opening 6a formed at a plurality of locations around the conduit and directed an angle to intersect the component 5 directed outwardly through a nozzle opening 7a from the ring conduit 7. The intersection of these propellant component streams enhances their interreaction. The impeller blades 12 define passages 13 therebetween through which the propellant components pass. The impeller 1' may be mounted for rotation of the arrangement in fixed position in which the passages 13 align with the corresponding passages 6a or 7a. Rotation of the impeller 1' enhances the flow and whirling characteristics of the propellants and the resulting gases which are formed by their interreaction.

Figure 5:
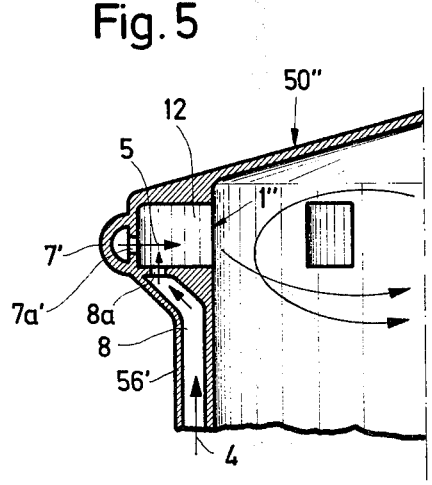
FIG. 5 is a view similar to FIG. 4 of another embodiment of the invention.

In the construction indicated in FIG. 5, an oxygen propellant component indicated by the arrow 4 moves along cooling channels 8 defined along the wall 56' and through discharge openings 8a into the space containing the impeller 1''. Another propellant component is again introduced through the ring conduit 7' through openings 7a'.

While specific embodiments of the invention have been shown and described in detail to illustrate the application of the principles of the invention, it will be understood that the invention may be embodied otherwise without departing from such principles.

What is claimed is:

1. An arrangement for the production of rotational energy for rocket combustion chambers which are activated only by hypergolically reacting propellant components, comprising wall means defining a rocket combustion chamber having a closed rear end and a gas discharge front end, an impeller comprising a mushroom shaped body of revolution having an outwardly and forwardly facing surface facing the rear end, said impeller being mounted adjacent said closed rear end and having a plurality of spaced radially extending upstanding curved vanes on said surface, said vanes having front inwardly curved sides and rear outwardly curved sides and the curvature of said vanes being such that on their rear sides flow between said blades produces an area of reduced pressure, said vanes defining flow ducts therebetween having radially outer discharge openings directed tangentially, a plurality of passages extending through said blades, and means for directing the reacting propellant components including an oxygen carrier together with other components at the same time but in separate streams and concentrically of said impeller and into the radial inner ends of said flow ducts for interaction with each other in said ducts and for flow along said ducts to the outer circumference of said impeller and substantially tangentially into the combustion chamber with the oxygen carrier being directed radially inwardly of said impeller from the other of said components.

2. An arrangement according to claim 1, wherein said wall means includes a combustion chamber wall having a cooling passage therethrough, one of said propellant components comprising oxygen flowing through said cooling passage, said cooling passage discharging into said flow ducts of said impeller.

3. An arrangement for the production of rotational energy, in particular, for rocket combustion chambers which are activated by hypergolically reacting propellant components, comprising wall means defining a rocket combustion chamber having a closed end and a gas discharge end, an impeller mounted in said closed end and having a plurality of spaced radially extending vanes defining flow ducts therebetween, and means for directing hypergolically reacting propellant components together into said combustion chamber into the radial inner ends of said flow ducts for interaction with each other and for flow to the periphery of said ducts for peripheral discharge into the combustion chamber, said combustion chamber including a wall having a hollow space therein, said impeller being arranged within said combustion chamber hollow wall space.

4. An arrangement according to claim 1, wherein said wall includes a propellant ring conduit for each propellant component having a discharge into the hollow space into the impeller flow ducts.

5. An arrangement for the production of rotational energy for rocket combustion chambers which are activated only by hypergolically reacting propelling components, comprising wall means defining a rocket combustion chamber having a rear closed end and a gas discharge end, an impeller mounted in said closed end and having a forwardly and radially outwardly inclining surface with a plurality of spaced radially outwardly and rearwardly extending vanes defining flow ducts therebetween over said surface having radially outer discharge openings between ducts directed tangentially, means for directing an oxidizer reacting propellant component into said combustion chamber into the radial inner end of said flow duct and along the bottom of said duct for flow radially outwardly therein, means for applying a fuel into said flow duct at the radial inner end over the oxidizer for flow therewith and for interreaction with the oxidizer and for discharge substantially tangentially into the combustion chamber, said vanes being curved so that they form depression areas intermediate their length on the side of the duct which is concave, said propellant components tending to evaporate in said zones by hypergolic reaction.

6. An arrangement according to claim 5, wherein said duct vanes have openings therethrough for the flow of fuel in the depression areas between adjacent ducts in order to increase the hypergolic interreaction.

* * * * *